June 30, 1936.      A. F. SPITZGLASS ET AL      2,045,621
CALCULATING APPARATUS
Filed Aug. 28, 1933      4 Sheets-Sheet 1

Inventors
Albert F. Spitzglass
and Otto T. Handwerk
by
Attorney

June 30, 1936.  A. F. SPITZGLASS ET AL  2,045,621
CALCULATING APPARATUS
Filed Aug. 28, 1933   4 Sheets-Sheet 2

Inventors
Albert F. Spitzglass
and Otto T. Handwerk
by
Attorney

June 30, 1936. A. F. SPITZGLASS ET AL 2,045,621
CALCULATING APPARATUS
Filed Aug. 28, 1933 4 Sheets-Sheet 3

Inventors
Albert F. Spitzglass
and Otto T. Handwerk
by
Attorney

June 30, 1936.  A. F. SPITZGLASS ET AL  2,045,621

CALCULATING APPARATUS

Filed Aug. 28, 1933  4 Sheets-Sheet 4

Inventors
Albert F. Spitzglass
and Otto T. Handwerk
by J. W. McConkey
Attorney

Patented June 30, 1936

2,045,621

UNITED STATES PATENT OFFICE 2,045,621

CALCULATING APPARATUS

Albert F. Spitzglass and Otto T. Handwerk, Chicago, Ill., assignors to Republic Flow Meters Company, Chicago, Ill., a corporation of Illinois Application August 28, 1933, Serial No. 687,064

16 Claims. (Cl. 235—61)

This invention relates to mechanical calculation, especially multiplication and division, whereby two or more independent quantities are each proportioned to the movement of parts, such for example as arms or the like movable around given centers and generating angles each in proportion to the numerical value of one of the varying quantities, while by means such as a system of links the angles of movement corresponding to the respective quantities are combined to produce a new angle or other function, whose magnitude is proportional to the product (or other function) of the respective angles corresponding to the independent quantities.

Multiplication devices and the like of various kinds as now current in the art practically all embody either the principles of logarithmic addition or of repeated addition. The former are inconvenient for many uses inasmuch as they require irregular scales, so that for example it is exceedingly difficult to use them in indicating and recording instruments and the like. They are also limited to the multiplication of two factors at a time. That is, the multiplication of three or more quantities cannot conveniently be made simultaneously but is made as a series of separate operations involving only two factors at a time. The mechanical devices operating on the principle of repeated addition are complicated and expensive; and do not give simple direct-reading results which adapt them for use as parts of various devices which require movements proportional to both of two quantities (and therefore to their product).

It is an object of the present invention to enable the simultaneous multiplication of more than two quantities at once as well as to perform the operation of multiplication (or division) of two or more quantities with scales having movements with equal increments for the same changes in the quantities, and therefore suitable for use in various types of instruments. It is moreover an important object to provide a simple, fool-proof, and inexpensive apparatus for multiplying (or dividing) two or more quantities in a certain and accurate manner. Another object is to make the motion of each element of the apparatus independent of the motion of all the other elements representing the quantities, so that mechanical means can be readily utilized to move or be moved by all the various elements simultaneously or at intervals to the proper positions on the scales and to obtain their product (or quotient) on an equally divided natural scale.

Having these objects in view, one form of apparatus comprises two or more parts, for example angularly-movable arms pivoted in a novel relationship explained below, movable proportionately to the quantities to be multiplied, and arranged to actuate an indicating or actuated part proportionately to the product of those quantities. In the illustrated arrangement all of these parts move over graduated scales so that the product may be read from the position of the indicating part on its scale, but the mechanism is also suited for uses in which such scales are not required.

We prefer to so arrange the apparatus that each of the scales is graduated in a uniform manner from a zero position at one end to a position at the other end representing unity, or one hundred per cent. That is, the decimal point in the illustrated scales is disregarded the same as on an ordinary slide rule, and all numbers are regarded as being represented by unity (one hundred per cent) or a decimal fraction thereof. By this arrangement all products also fall between zero (0 x 0) and unity (1 x 1), or (if regarded as percentages) between 0% and 100%.

In one simple and effective arrangement, the invention is embodied in a simple linkage or the like, shown as including pivoted arms movable to represent the quantities being multiplied between zero positions and positions representing unity (or one hundred per cent). These arms, in the arrangement shown in the drawings, are mounted at opposite ends on pivots whose axes respectively substantially intersect the opposite arms when in the positions representing unity. From a slightly different point of view, the frame of the apparatus may be regarded as the equivalent of a fixed link connecting the two pivots.

These arms may be connected, as shown, by links or the like to a part which is moved in a sector-shaped area in accordance with the movement of both of the pivoted arms. The movement of this part is transferred, by means such as another connecting link, or by an equivalent geared arrangement, to a third pivoted arm forming the indicating or actuated member, and which preferably moves over a scale from which the product can be read, or which is connected to suitable indicating or recording means in various instruments in which the apparatus may be used.

In the arrangement which at present we consider the simplest, this last or actuated arm is mounted with its pivot coaxial with the pivot of one of the first two arms, and generally at a predetermined angle such as a right angle to one of the arms when both are in their 50% positions, and with its scale having its zero coincident or in line with the zero of the scale of the other of the first two arms, the two scales being therefore intersecting arcs in the arrangement illustrated.

Thus the actuated arm and its link, and the above-mentioned arm of the first two together with its link, form in this particular embodiment a parallelogram linkage, with the above-mentioned part movable in its sector arranged to serve as the connection between the two links. This part is also connected by a link to the movable end of the other one of the first two arms, and is actuated thereby to swing the parallelogram in such a manner as to transfer the desired product to the scale of the actuated arm.

The above operation can of course be reversed, in the case of dividing one quantity by another, the quotient being read on one of the first two arms, the actuated arm being set (either directly or by manipulating said one of the other arms) for one of the two quantities and the other of the first two arms being set for the other (the divisor). It is the intention, throughout the description and claims, wherever multiplication is spoken of, to include division by this obvious reversal of the manner of reading.

The above described linkage may be compounded, as fully explained below, to include further elements operating on the same principles and giving the product (or quotient) of three or more quantities. Further, by suitable manipulation hereinafter described, the powers and roots of numbers may be obtained, this being a special case of multiplication or division where two or more of the quantities are the same.

Another feature of the invention relates to connecting the arms or their equivalents by gearing or the like, so that they move together to extract roots and raise to powers directly. Preferably the connecting means is disconnectable so that the apparatus may also be used for ordinary multiplication and division as described above.

The above and other objects and features of the invention, including various novel combinations of parts and desirable particular constructions, will be apparent from the following description of the illustrative embodiment shown in the accompanying drawings, in which.

Figure 1:
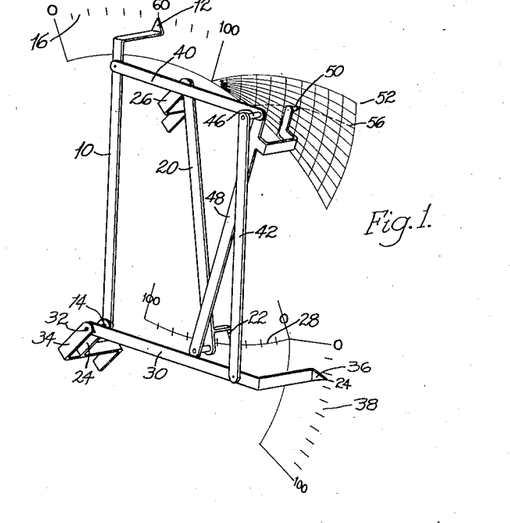
Figure 1 is a perspective view of the illustrative form of apparatus, with the parts in the positions they would occupy in multiplying .6 by .4 (or, in percentages, 60% by 40%), or in dividing .24 by either .6 or .4 in reading backwards to divide instead of multiply.

The apparatus in the particular embodiment shown in Figure 1, regarded as a mechanical structure, includes an arm 10 having a pointer 12 at its upper end and mounted at 14 at its lower end on a pivot or shaft for angular movement to carry the pointer 12 between a zero position at the left end of a scale 16 and a position at the right end of the scale representing 100% or unity.

Mounted on a pivot or shaft 18, which is in line with the arm 10 adjacent its movable end at the time pointer 12 is at its 100% (or unity) position on scale 16, is a second arm 20 having a pointer 22 at its lower end. The pivots or shafts 14 and 18 are shown mounted in suitable stationary brackets or other supports 24 and 26. The pivots 14 and 18 may be regarded as connected by a rigid link or other connection, which in this case is the frame of the apparatus.

The pointer 22 swings along a scale 28 having its zero position at the right in such a position that the arm 20 at zero is parallel to the arm 10 at zero, and having its 100% (or unity) position at the left.

It will be seen that this brings the 100 on scale 28 in line with the axis of the shaft or pivot 14, or at least on a line intersecting this axis and drawn from the axis of the shaft or pivot 18. Actually, of course, the scale 28 may be moved up or down and at the same time made shorter or longer, so long as the zero represents the position of arm 20 when parallel to arm 10 in its zero position and the 100 represents the position of arm 20 when it lies along a line connecting the two shafts or pivots 14 and 18.

The third or indicator arm, indicated at 30, is mounted horizontally (i. e. generally perpendicular to the arm 10) on a shaft or pivot 32 which is coaxial with respect to the shaft or pivot 14 and which is shown mounted on an arm 34 of the bracket or support 24. Arms 10 and 30, in this embodiment, are only exactly perpendicular when both are in their 50% positions.

The indicator arm 30 has a pointer 36 moving over a vertical scale 38. The zero of the scale 38 is determined by the position of the arm 30 when both arm 10 and arm 20 are in their zero positions. The 100% (or unity) position of the scale 38 is determined by the position of the arm 30 when the arms 10 and 20 are in their 100% (or unity) positions. In the arrangement illustrated, the scale 38, like the scale 16 and the scale 28, is an arc of 30°.

The first arm 10 and the third arm 30 are connected by two links 40 and 42. The link 40 is connected to arm 10 at the intersection of that arm with the axis of the shaft or pivot 18 when the arm is at 100 on its scale 16, and the length of the link 40 is equal to the length of arm 30 between the axis of its shaft or pivot 32 and its point of connection to the link 42.

The link 42 is equal in length to the length of arm 10 between its shaft or pivot 14 and its point of connection with link 40, and it is connected to arm 30 at such a point that arms 10 and 30 and links 40 and 42 form a true parallelogram.

The two links 40 and 42 are connected by a part such as a floating shaft or pivot 46, to which is also connected a third link 48, equal in length to link 42. The lower end of the link 48 is pivotally connected to the lower end of the arm 20. The upper ends of links 42 and 48 at all times move about the same axis (i. e. the axis of the floating shaft or pivot 46); their pivots at their lower ends are coaxial so long as both arms 20 and 30 are in zero position.

For convenience in the following description, although not necessary to the manipulation of the apparatus, link 48 is provided with a pointer 50 which is alined with the axis of the floating shaft or pivot 46 and which therefore indicates the position of that part regardless of the angular movements of link 48 about that axis.

Figures 2, 8, 9:
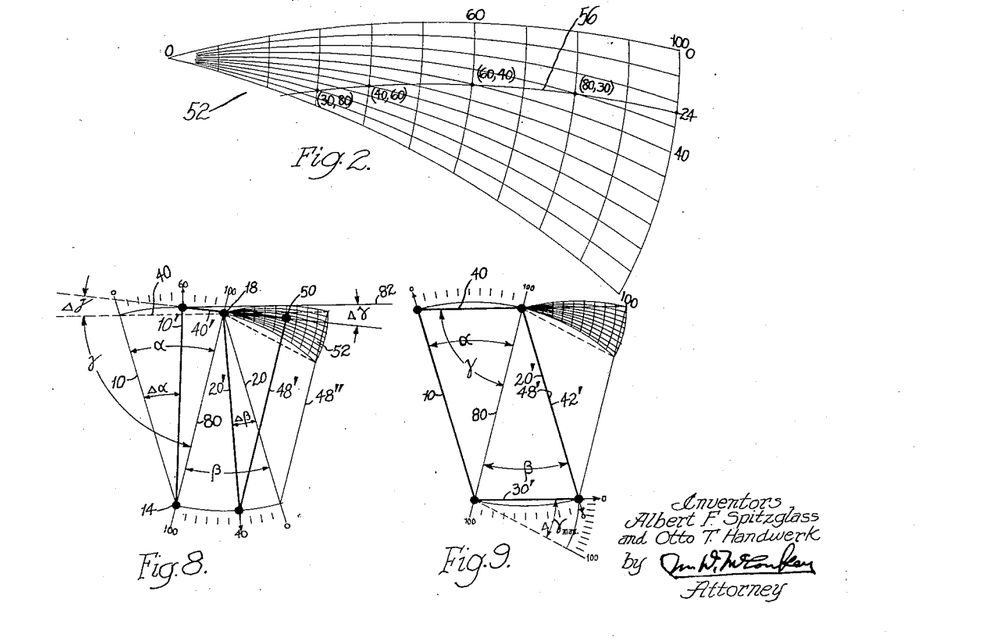
Figure 2 is a diagram, on a larger scale, of the sector-shaped area traversed by the part which connects the links from the first and third arms and which is connected by another link to the movable end of the second arm.
Figures 8 and 9 are diagrams used in one explanation of the operation of the apparatus.

The pointer 50, to facilitate the description of the operation of the apparatus, is shown movable over a sector-shaped diagram 52, shown on an enlarged scale in Figure 2. This diagram is constructed by describing horizontal arcs with the pointer 50 by moving arm 10 from zero to 100, with arm 20 at each 10 points on its scale (i. e. 10, 20, 30, 40, 50, 60, 70, 80, 90, and 100), and then describing vertical arcs with the pointer 50 by similarly moving arm 20 from 0 to 100 with arm 10 at each 10 points on its scale.

It will be seen that the parts of the apparatus in this embodiment have in general, four limiting positions shown respectively in Figures 3, 4, 5, and 6.

With arms 10, 20, and 30 all at zero (Figure 3) the arm 20 and links 48 and 42 are all parallel, one behind the other, the axes of the pivots connecting link 42 and arm 30 and link 48 and arm 20 are coincident, and the axis of the pivot connecting links 40 and 42 is coincident with the axis of the shaft or pivot 18 on which the arm 20 is mounted.

Figure 4:
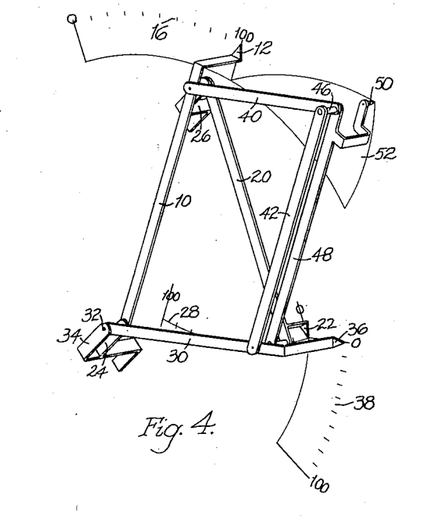

Now if arm 10 is moved to bring pointer 12 to 100 on its scale 16, we have the parts in the positions shown in Figure 4. Arm 20 has become the diagonal of the parallelogram 10—40—42—30; pointer 50 has moved to the upper righthand corner of its sector 52; but links 42 and 48 remain parallel, one behind the other. The pointer 36 has not moved, this being correct as indicating the product of 100 on the scale 16 and 0 on the scale 28.

Figure 5:
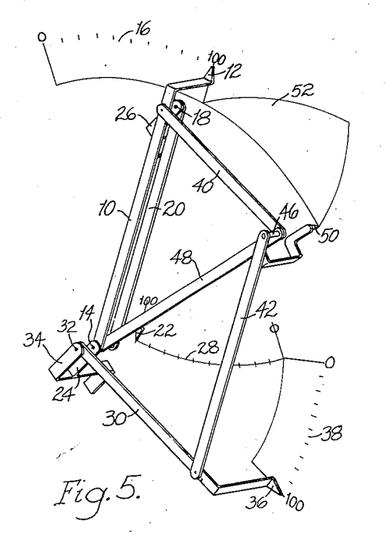

The arm 20 may now be moved to carry its pointer 22 to 100 on its scale 28, giving the arrangement shown in Figure 5. The link 48 is now the diagonal of parallelogram 10—40—42—30; arm 10 and link 20 are now parallel, one behind the other; pointer 50 has moved to the lower righthand corner of its sector-shaped diagram 52; and pointer 36 of arm 30 has moved to 100 on its scale 38. This is correct, of course, as (disregarding the decimal point) pointer 36 now shows the product of 100 on the scale 16 and 100 on the scale 28.

Figure 6:
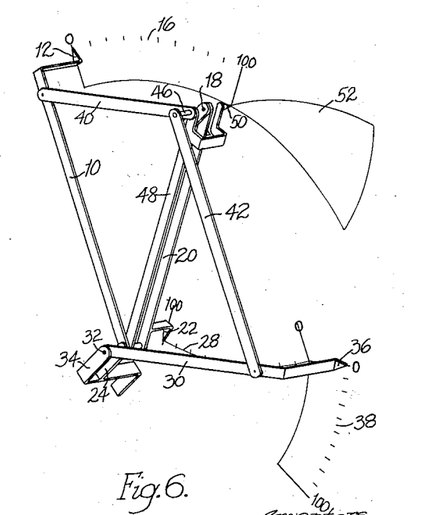

Arm 10 may now be moved to carry its pointer 12 back to 0 on its scale 16, giving the arrangement of Figure 6. Both arm 20 and link 48 now lie along the diagonal of the parallelogram 10—40—42—30, and they are arranged parallel to each other, one behind the other; pointer 50 has moved back to its starting point at the apex of its sector-shaped diagram 52; and pointer 36 has moved back to zero. This obviously is correct, as the pointer 36 now indicates the product of 0 on the scale 16 and 100 on scale 28.

Figure 3:
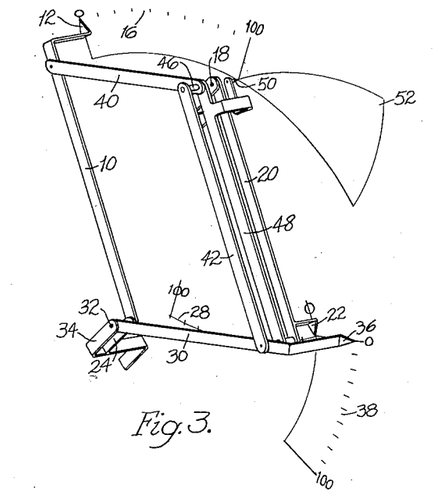
Figures 3, 4, 5, and 6 are diagrammatic views of the apparatus of Figure 1, with the parts in different positions.

Moving arm 20 to carry its pointer 22 back to zero on its scale 28 would put the parts back in the positions shown in Figure 3.

It will be seen, by a comparison of the above-described four figures, that so long as pointer 12 is set at 0, no movement of arm 20 will move pointer 36 away from 0 on its scale 38, as arm 20 and link 48 merely swing idly about their coincident axes at their upper ends. Similarly, so long as the pointer 22 is at 0, the parallelogram 10—40—42—30 merely swings idly between the positions of Figures 3 and 4, without moving pointer 36 from its zero position, since links 42 and 48 remain parallel, one behind the other, and merely swing idly back and forth.

Figures 1 and 2 illustrate the multiplication of numbers where both the pointers 12 and 22 are in intermediate positions between 0 and 100 on their respective scales. In Figure 1 the pointer 12 is at 60 and the pointer 22 is at 40, thereby moving pointer 50 to the intersection of the horizontal "40" arc with the vertical "60" arc. and moving pointer 36 to 24 (i. e. to 2400, after allowing for the correct position of the decimal point).

A comparison of Figures 1 and 2 shows that pointer 36 will remain at 24 so long as pointer 50 is at any position on an arc 56 which is the locus in the diagram 52 of all intersections of horizontal and vertical arcs representing members whose products give 2400 (e. g. 30 and 80, 40 and 60, 60 and 40, and 80 and 30).

Similarly each position of the pointer 36 on its scale represents a curve across the diagram 52 which is the locus of all the intersections of horizontal and vertical arcs representing quantities whose product is represented by that position. Thus by setting pointer 12 for one quantity, and pointer 22 for the other quantity, the product of any two quantities will be shown by pointer 36 on its scale 38.

It is believed obvious without further description that, in the case of division, the dividend may be set on the scale 38 and the divisor on either the scale 28 or the scale 16, whereupon the quotient will be shown on the other scale 16 or 28. It will sometimes be found convenient, in dividing one quantity by another, to set the divisor on scale 28 (or 16), and then move the arm 10 (or 20) until pointer 36 is opposite the dividend on scale 38 (instead of directly manipulating the arm 30 to move pointer 36 to that position), whereupon it will be found that pointer 12 (or 22) shows the quotient on its scale 16 (or 28). In the claims, especially, where multiplication is spoken of it is intended that the terms used be construed broadly to include this obvious reversal of operation by which division is accomplished or other equivalent functions obtained.

The device will be seen on mere inspection to be mathematically accurate in the four extreme positions shown in Figures 3, 4, 5, and 6. We have not as yet devised any simple geometrical demonstration to show the degree of accuracy in intermediate positions. Empirically, by actual test, we have however shown that any inaccuracy which may be inherent in the construction is at least so much smaller than errors in reading the scales, back-lash and other mechanical inaccuracies (no matter how carefully the device is built), and the like, that any inherent inaccuracies that there may be do not affect the practical result.

As explained above, the device is ordinarily used by disregarding decimal points, the same as a slide rule. However, for some uses where the quantities to be multiplied always come between 0 and 100 and may therefore be read directly on the scales 16 and 28, the scale 38 may be graduated from 0 to 10,000 and will therefore show the products directly, including the position of the decimal point. Similar types of graduation for other special purposes will be readily apparent.

Securing the square of a quantity merely means setting the quantity on both of the scales 16 and 28. The instrument could be modified for this purpose, if desired, by gearing the arms 10 and 20 together or otherwise connecting them so that they will move through equal arcs (preferably by disconnecting gearing or other means which can be disconnected to permit ordinary multiplication). In this case the setting of the quantity to be squared on the scale 16 (or 28) would automatically give its square on the scale 38. In this case, also, square roots could be obtained, since the setting of any quantity on the scale 38 would automatically show the square root on the scale 16 (or 28). Such obtaining of squares, and square roots, are special cases of multiplication and division respectively, and are intended to be included in the scope of my claims.

In the illustrated apparatus, each of the scales 16, 28, and 38 is 30° of arc about its center.

Figure 7:
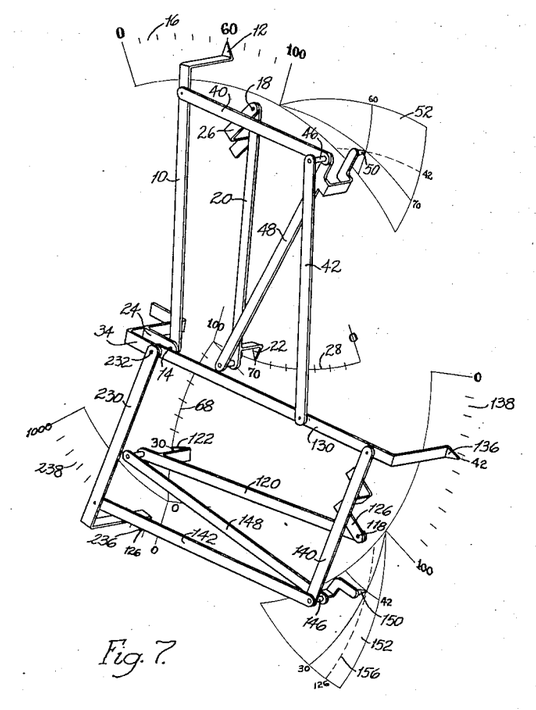
Figure 7 is a perspective view of a modification for multiplying (or dividing) three quantities.

In Figure 7 the apparatus is compounded to give the product (or quotient) of three quantities. The part of the instrument for multiplying the first two quantities is the same as previously described, except that for convenience of manipulation the arm 130 is made somewhat longer than the arm 30, so that its scale 138 (while of the same length as scale 38 in degrees) is linearly somewhat longer.

In the compounded part of the apparatus, arm 130 is connected up and has the functions of the arm 10 in the multiplication of the first two quantities. That is, the product (as indicated by pointer 136 on scale 138 and determined by the position of arm 130) of the first two quantities, and the third quantity, are to be regarded as two more quantities to be multiplied.

The third quantity (illustrated as being the number 30) is set by means of a pointer 122 movable over a scale 68 shown graduated from 0 to 100. The pointer 122 is mounted on a fourth arm 120 horizontally mounted on a shaft or pivot 118 carried by a bracket or support 126 arranged near the 100 end of scale 138.

The movable end of the arm 120 is connected by a link 148 to a floating shaft or pivot 146. The link 148 may if desired have a pointer 150 in the axis of the shaft or pivot 146 and movable over a sector-shaped diagram 152 corresponding to the diagram 52.

The floating shaft or pivot 146 is coaxial with respect to the shaft or pivot 118 when the pointer 150 is at the apex of its sector, this being at the time the arm 130 is at zero, and forms the connection between two links 140 and 142 forming two sides of a secondary parallelogram. Link 142 is equal in length to that part of arm 130 between the axis of its pivot and its point of pivotal connection to the upper end of link 140. Link 140 is equal in length to the effective length of a fifth, or secondary indicator, arm 230 extending downwardly from a shaft or pivot 232 on the bracket 34 and coaxial with respect to pivots 14 and 32. Arm 230 forms the fourth side of the secondary parallelogram.

Arm 230 is provided at its end with a pointer 236 moving along a final scale 238 on which the product of the three quantities is shown. To distinguish it conveniently, in use, from scale 138 the scale 238 is shown graduated from 0 to 1000. In the drawings, the three quantities 60, 70, and 30 are being multiplied to give 126,000. Disregarding the decimal point, this shows as 126 on the scale 238.

If the quantities are to be read (decimal points and all) on the scales, just as scale 138 would have to be graduated from 0 to 10,000, so would scale 238 have to be graduated from 0 to 1,000,000.

The modification shown in Figure 7 of course also can be operated in reverse order to divide instead of multiply. Also, by gearing or otherwise connecting arm 120 to the arms 10 and 20, so that they all three move angularly in unison, it can be used to secure the cube or the cube root of a quantity.

Figure 8 is a diagram which may be used in explaining one theory of operation. In this diagram, 80 is a rigid link connecting the fixed centers 14 and 18, or an equivalent connecting means such as the instrument casing in which the pivots 14 and 18 are mounted. The reference character 82 indicates a line from the pivotal connection of arm 10 and link 40, to the uppermost end of the vertical arc in sector 52 on which the pointer 50 rests. It will be noted that in any position of the arm 10, the line 82 is parallel to the original position of link 40 when arm 10 is at zero. The other reference characters indicate the same parts as in Figure 1, in their zero positions, primes and seconds being used to indicate the same parts in other than zero positions.

It will be seen that the angle between arm 10 and line 80 is indicated as the angle $\alpha$. In the illustration, angle $\alpha$ is 30°. When arm 10 is moved to a new position 10', it moves through an angle $\Delta\alpha$, corresponding to one of the quantities to be multiplied, and which decreases the original angle $\alpha$ by that much.

The angle between arm 20 and line 80 is indicated as $\beta$, and in the illustration is also 30°. The angle through which arm 20 is moved to a new position 20' is indicated as $\Delta\beta$, and corresponds to the second of the two quantities to be multiplied.

The original position of the link 40 relatively to the fixed reference line 80 is indicated by the angle $\alpha$. Moving arm 10 to position 10', and moving arm 20 to position 20', shifts link 40 to a position 40', the angular movement of the link (which corresponds to the product of the two quantities) being the angle $\Delta\alpha$. Since line 82 is parallel to the original or zero position of link 40, it will be seen that the angle between this line 82 and the link in its position 40' will also be angle $\Delta\alpha$.

Since the angle $\Delta\alpha$ is proportionate to the required product, the arcuate distance from line 82 to pointer 50 is of course also proportionate to that product. This is the distance which is transferred to the indicating arm 30 by means such as the link 42 or its equivalent, and is finally indicated on the scale 38.

From the point of view of this explanation, it will be seen that the principal parts of the apparatus comprise a link or casing or other support 80 fixing the relative positions of two pivots 14 and 18, two levers mounted on said pivots and preferably parallel to each other in their zero positions, and two links (40 and 48) connected to each other and to the movable ends of the levers.

For the sake of clearness, the initial positions of the parts, with arm 30 and link 42 added, are shown separately in Figure 9.

Figure 10:
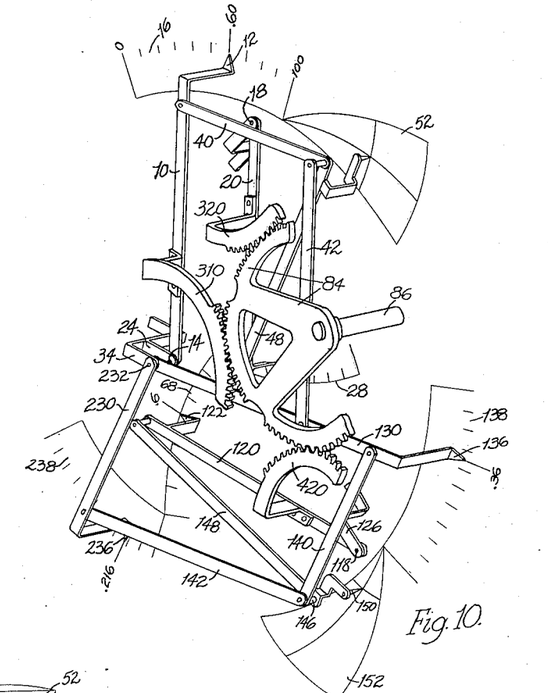
Figure 10 is a view corresponding to Figure 7, but showing disconnectable gearing for causing the parts to move together to extract roots and raise to powers.

In Figure 10 is shown one arrangement for connecting the levers 10, 20, 120, etc., for extracting roots and raising to powers. In this arrangement, arm 10 is provided with an arcuate rack 310, arm 20 has a similar arcuate rack 320, and arm 120 has a similar arcuate rack 420. These three racks all mesh with teeth on a segmental connecting pinion 84 mounted on an oscillatable shaft 86.

By this arrangement, when the described rack-and-pinion gearing is in mesh, the three levers 10, 20, and 120 must all move in unison, and all show the same quantity on their respective scales. Pointer 136 of course then shows the square of this quantity, pointer 236 shows its cube, and so on. Conversely, each pointer 12 or 22 or 122 shows the square root of the quantity on scale 138, the cube root of the quantity on scale 238, and so on.

The shaft 86 is mounted in its bearing (not shown) so that it may be shifted axially to the left to disengage pinion 84 from the three racks, so that the device may be used for ordinary multiplication and division.

Figure 11:
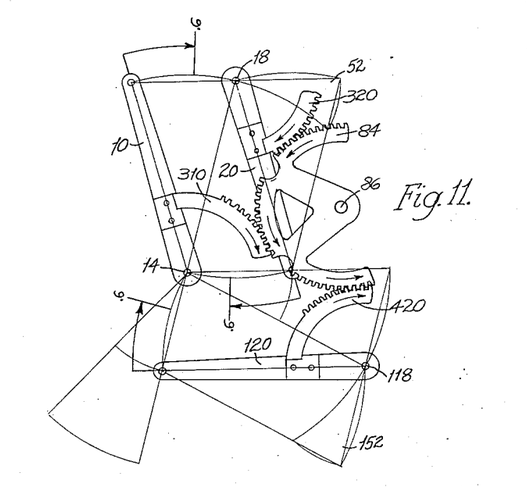
Figure 11 is a plan view diagram of the mechanism of Figure 10.

In Figure 11 is shown a diagram of the mechanism of Figure 10, with the levers 10, 20, and 120, and their three racks 310, 320, and 420, together with the segmental pinion 84, shown in plan, and the other parts indicated diagrammatically by lines.

Figure 12:
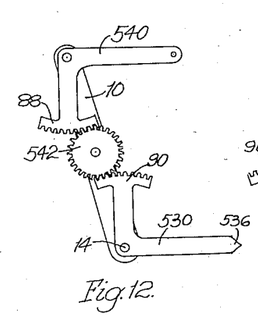
Figures 12, 13, and 14 are views, in three different positions, of a lever-and-gear arrangement which can be substituted for the actuated arm and its link in Figure 1.
Figures 13, 14:
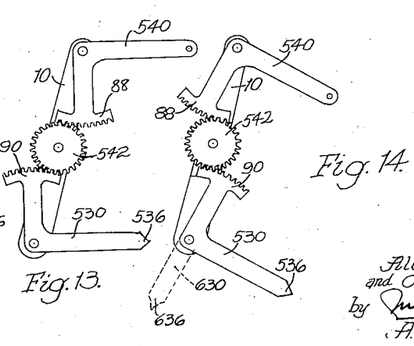

In Figures 12, 13, and 14 there is shown, in three positions, a gear mechanism which may be substituted for the link 42 and the arm 30. This mechanism is mounted on, and carried by, the arm 10.

In the illustrated form, this gearing includes a right-angle bellcrank lever 540, the upper arm of which corresponds to and is connected in the same manner as link 40, and which is formed at its lower end with an arcuate rack 88. At the lower end of arm 10, on the pivot 14, is mounted another right-angle bellcrank lever 530, the lower arm of which corresponds to the lever 30 and carries a pointer 536 corresponding to pointer 36. The upper arm of the bellcrank 530 is equal in length to the lower arm of bellcrank 540, and carries an arcuate rack 90. The racks 88 and 90 both mesh with a pinion 542 journaled on the arm 10, so that they must always move oppositely and in equal amounts.

Thus the angular motions of the bellcrank 540, which are proportionate to the desired product, are transferred to the pointer 536 in a manner which is the geared equivalent of the transfer of this product to the pointer 36 by means of the link 42.

Figures 12 and 13 show arm 10 at zero and 100, with arm 20 at zero, showing that pointer 536 remains at zero. These figures correspond respectively to Figures 3 and 4. Figure 14 corresponds to Figure 5, and shows the positions of the parts when arm 20 is moved to 100.

One advantage of this geared construction is that the pointer arm of bellcrank 530 is not necessarily parallel to the upper or link portion of bellcrank 540 as is the case with a parallelogram linkage. As shown in dotted lines in Figure 14, the pointer 636 and its pointer arm 630 may be at any desired angle relatively to bellcrank 540 and will always be maintained at that same relative angle, so that the angular movements of bellcrank 540 will still be transferred to the pointer 636. This facilitates placing the scale 38 anywhere on the instrument that it may be desirable or convenient to have it.

While several particular illustrative embodiments have been described in detail, it is not our intention to limit the scope of the invention to that particular apparatus, or otherwise than by the terms of the appended claims.

As pointed out above, in considering the claims the term multiplication is intended to include the reverse operation of division, as well as the special cases of raising to powers and extracting roots. The scales are spoken of in some of the claims as extending from a zero position to a 100% position, but it is not intended to imply thereby that they are necessarily graduated in that manner, but merely that they operate functionally as described.

We claim:

1. An instrument comprising a base, an arm pivoted at one end on said base and swingable about said pivot, the free end of said arm being movable through an arc from a first position representing 0% to a second position representing 100%, a second arm pivoted at one end on said base on a pivot underlying said first arm when it is in its second position and with its free end movable through an arc from a first position representing 0% to a second position representing 100%, a third arm pivoted at one end to the free end of the second arm, a link pivoted to the free ends of said first and third arms, said first, second and third arms being of equal length between their pivotal connections, a fourth arm pivoted at one end on said base on a pivot coaxial with the pivot of said first arm and with its free end swingable through an arc from a first position representing 0% to a second position representing 100%, and a second link pivoted to the free ends of the third and fourth arms, said fourth arm and first link being of equal lengths between their pivots and said second link being equal in length to said first, second and third arms.

2. An instrument comprising a first arm mounted on a fixed pivot and swingable through an arc about said pivot, a second arm mounted on a fixed pivot spaced from the first pivot, a third arm pivoted at one end to the free end of the second arm, a link pivoted to the free ends of the first and third arms, a fourth arm mounted on a fixed pivot coaxial with the pivot of said first arm, and a second link pivoted to the third arm coaxially with the pivotal connection thereto of the first link, the first link and fourth arm being of equal length and the second link and first, second and third arms being of equal length.

3. An instrument comprising a pair of arms pivoted at one end on coaxial fixed pivots, a third arm pivoted at one end on a fixed pivot spaced from the first pivot, and three links coaxially pivoted at one end on a floating pivot and having their free ends pivotally connected to the free ends of said arms respectively.

4. An instrument comprising four links pivotally connected at their ends to form a parallelogram linkage, one of the pivot points being fixed, a fifth link connected to the pivot point diametrically opposite to the fixed pivot, and a sixth link pivoted at one end to the free end of the fifth link and at its other end to a fixed pivot spaced from the first fixed pivot.

5. An instrument comprising four links pivotally interconnected at their ends, alternate ones of said links being of equal length to form a parallelogram linkage and one of the pivots being fixed, a fifth link connected to the pivot diametrically opposite the fixed pivot and equal in length to one of the adjacent links, and a sixth link equal in length to the fifth link and pivoted to the free end of the fifth link at one of its ends, the other end of the sixth link being connected to a fixed pivot spaced from the first fixed pivot a distance equal to the length of the sixth link.

6. An instrument comprising two spaced pivots, the line between said pivots forming a datum line, two arms pivoted to said pivots respectively, a third arm pivoted to the free end of one of said first named arms, all of said arms being equal in length to said datum line, and a link connecting the free ends of said third arm and the other of said first named arms, whereby the link will be moved angularly proportionately to the product of the angular movements of said first two arms.

7. An instrument comprising a pivot, an arm mounted on said pivot, a second pivot spaced from said first pivot a distance equal to the length of said arm, a second arm mounted on said second pivot and equal in length to said first arm, a third arm equal in length to said first and second arms and pivoted at one end on the free end of the second arm, and a link connecting the free ends of the first and third arms.

8. An instrument comprising a pivot, an arm mounted on said pivot, a second pivot spaced from said first pivot a distance equal to the length of said arm, a second arm mounted on said second pivot and equal in length to said first arm, a third arm equal in length to said first and second arms and pivoted at one end on the free end of the second arm, and a link connecting the free ends of the first and third arms, a fourth arm pivoted coaxially with said first pivot, and means connecting said link and said fourth arm to move the fourth arm angularly proportionately to angular movement of the link.

9. An instrument comprising a pivot, an arm mounted on said pivot, a second pivot spaced from said first pivot a distance equal to the length of said arm, a second arm mounted on said second pivot and equal in length to said first arm, a third arm equal in length to said first and second arms and pivoted at one end on the free end of the second arm, and a link connecting the free ends of the first and third arms, a fourth arm pivoted coaxially with said first pivot, and gearing carried by said first arm and connecting said link and said fourth arm to move the fourth arm angularly proportionately to angular movements of the link.

10. An instrument comprising a pivot, an arm mounted on said pivot, a second pivot spaced from said first pivot a distance equal to the length of said arm, a second arm mounted on said second pivot and equal in length to said first arm, a third arm equal in length to said first and second arms and pivoted at one end on the free end of the second arm, and a link connecting the free ends of the first and third arms, a fourth arm pivoted coaxially with said first pivot, gear segments carried by said fourth arm and said link, and a gear carried by said first arm and meshing with said segments to maintain the fourth arm and the link in parallelism.

11. An instrument comprising a pivot, an arm mounted on said pivot, a second pivot spaced from said first pivot a distance equal to the length of said arm, a second arm mounted on said second pivot and equal in length to said first arm, a third arm equal in length to said first and second arms and pivoted at one end on the free end of the second arm, and a link connecting the free ends of the first and third arms, a fourth arm pivoted coaxially with said first pivot, and a second link connecting said first link and said fourth arm to move the fourth arm angularly proportionately to angular movements of the first link.

12. An instrument comprising a pivot, an arm mounted on said pivot, a second pivot spaced from said first pivot a distance equal to the length of said arm, a second arm mounted on said second pivot and equal in length to said first arm, a third arm equal in length to said first and second arms and pivoted at one end on the free end of the second arm, and a link connecting the free ends of the first and third arms, a fourth arm equal in length to said link pivoted coaxially with said first pivot, and a second link equal in length to said first three arms connecting the first link and fourth arm to maintain the same in parallelism.

13. An instrument comprising a pivot, an arm mounted on said pivot, a second pivot spaced from the first pivot a distance equal to the length of the arm, a second arm equal in length to the first arm and mounted on the second pivot, a third arm equal in length to the first and second arms and pivoted to the free end of the second arm, a link connecting the free ends of the first and third arms, and means connecting the first and second arms for simultaneously moving them through equal angles.

14. An instrument comprising a pivot, an arm mounted on said pivot, a second pivot spaced from the first pivot a distance equal to the length of the arm, a second arm equal in length to the first arm and mounted on the second pivot, a third arm equal in length to the first and second arms and pivoted to the free end of the second arm, a link connecting the free ends of the first and third arms, a fourth arm pivoted coaxially with said first arm, means connecting said fourth arm to said link to move the fourth arm angularly proportionately to angular movements of the link, a third pivot spaced from said first pivot a distance equal to the length of the fourth arm, a fifth arm equal in length to the fourth arm and pivoted on said third pivot, a sixth arm equal in length to said fourth arm and pivoted to the free end of the fifth arm, and a link connecting the free ends of the fourth and sixth arms.

15. An instrument comprising a pivot, an arm mounted on said pivot, a second pivot spaced from the first pivot a distance equal to the length of the arm, a second arm equal in length to the first arm and mounted on the second pivot, a third arm equal in length to the first and second arms and pivoted to the free end of the second arm, a link connecting the free ends of the first and third arms, a fourth arm pivoted coaxially with said first arm, means connecting said fourth arm to said link to move the fourth arm angularly proportionately to angular movements of the link, a third pivot spaced from said first pivot a distance equal to the length of the fourth arm, a fifth arm equal in length to the fourth arm and pivoted on said third pivot, a sixth arm equal in length to said fourth arm and pivoted to the free end of the fifth arm, a link connecting the free ends of the fourth and sixth arms, a seventh arm pivoted coaxially with said first pivot, and means connecting the seventh arm and the last named link to move the seventh arm angularly proportionately to angular movement of the said link.

16. An instrument comprising a pivot, an arm mounted on said pivot, a second pivot spaced from the first pivot a distance equal to the length of the arm, a second arm equal in length to the first arm and mounted on the second pivot, a third arm equal in length to the first and second arms and pivoted to the free end of the second arm, a link connecting the free ends of the first and third arms, a fourth arm pivoted coaxially with said first arm, means connecting said fourth arm to said link to move the fourth arm angularly proportionately to angular movements of the link, a third pivot spaced from said first pivot a distance equal to the length of the fourth arm, a fifth arm equal in length to the fourth arm and pivoted on said third pivot, a sixth arm equal in length to said fourth arm and pivoted to the free end of the fifth arm, a link connecting the free ends of the fourth and sixth arms, and means for simultaneously moving the first, second, and fifth arms through equal angles whereby the last named link will be moved through an angle proportionate to the cube of the angular movement of said arms.

ALBERT F. SPITZGLASS.
OTTO T. HANDWERK.

Certificate of Correction

Patent No. 2,045,621. June 30, 1936.

ALBERT F. SPITZGLASS ET AL.

It is hereby certified that errors appear in the printed specification of the above numbered patent requiring correction as follows: Page 4, second column, lines 44, 48, 51, and 52, strike out the Greek letter alpha "$\alpha$" and insert instead the Greek letter gamma "$\gamma$"; and that the said Letters Patent should be read with these corrections therein that the same may conform to the record of the case in the Patent Office.

Signed and sealed this 18th day of August, A. D. 1936.

[SEAL]

HENRY VAN ARSDALE,
*Acting Commissioner of Patents.*